June 8, 1943. E. M. BRANSON 2,321,004
OPTICAL DEVICE
Original Filed May 21, 1937
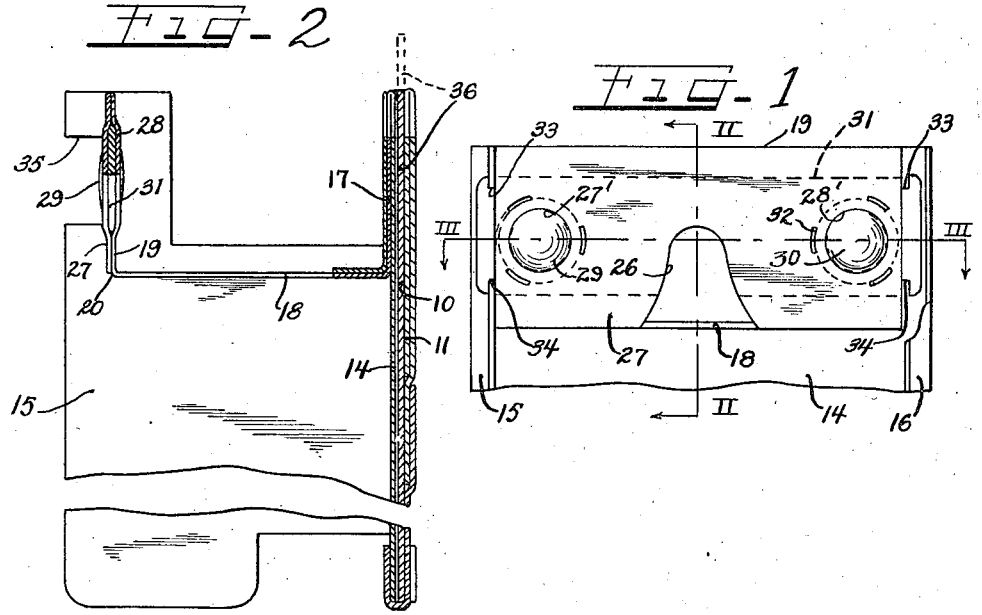
Inventor
Ellis M. Branson Patented June 8, 1943

2,321,004

UNITED STATES PATENT OFFICE 2,321,004

OPTICAL DEVICE

Ellis M. Branson, Orlando, Fla.

Original application May 21, 1937, Serial No. 143,923. Divided and this application February 15, 1940, Serial No. 319,013

1 Claim. (Cl. 88—29)

The present invention relates generally to optical devices, such as stereoscopes and the like utilizing lenses in their construction, and is more particularly concerned with improvements in the construction of such lenses and their mounting and the method of making the same.

This invention constitutes a division of my copending application Serial No. 143,923, filed May 21, 1937, and which has become Patent No. 2,190,-646, dated February 20, 1940, covering an "Optical device".

Heretofore, it has been the usual practice to provide devices of this character with lenses constructed of glass. These lenses were not only expensive in themselves, but necessitated the use of an expensive mounting. The cost of optical devices utilizing glass lenses was consequently materially increased, and there was always the possibility of breaking or otherwise damaging the lens. These disadvantages were especially objectionable in the case of portable optical devices and in the case of devices such as the mailable stereoscope disclosed and described in my aforesaid pending application, which is adapted for use as an advertising medium.

Having in mind the above as well as other objections to the usual lens construction in optical devices, it is a primary object of the herein described invention to provide an improved method of making an optical lens.

A further object of the invention is to provide an improved article of manufacture comprising an integrally formed lens structure and mounting means therefor.

Another object of the present invention is to provide an improved lens structure for optical devices, in which the lens is constructed of a moldable plastic to the end that the lens will be unbreakable and may be produced inexpensively.

Other objects and features of the invention will more fully appear from the following detailed description, taken in connection with the accompanying drawing, which illustrates several embodiments thereof, and in which:

Figure 1 is a fragmentary front view of an optical device, in this instance, a stereoscope, embodying the features of the present invention;

Figure 2 is an enlarged fragmentary sectional view through the device to show various details of its construction, taken substantially on the line II—II of Figure 1;

Figure 3 is a transverse sectional view of the same, taken substantially on the line III—III of Figure 1;

Figure 4 is a plan view of a preferred construction of lens and mounting for the device; and Figure 5 is a longitudinal section view through the same, taken substantially on the line V—V of Figure 4.

As shown on the drawing:

As illustrative of the device in which the present invention may be incorporated, there is shown a stereoscope in the form of a mailing piece which may be folded for mailing and unfolded for utilization in viewing pictures, advertising matter and the like. More specifically, the device comprises a main body portion in the form of an envelope in which a pocket 10 is formed from a single sheet of material by folding the marginal edges of the sheet to form a main back portion 11 and inwardly extending portions 12 and 13 which define the forward wall of the envelope pocket.

Secured to the outer surfaces of the portions 12 and 13 is a single sheet of material having a main portion 14 which is co-extensive with the envelope and is secured to the portions 12 and 13 in any appropriate manner, as by gluing or otherwise. The sheet from which the main portion 14 is constructed is laterally extended to form wings 15 and 16, which wings extend beyond the lateral edges of the envelope and are provided with fold lines which are coincident with the lateral edges of the envelope.

At the open end of the envelope, as shown in Figure 2, the sheet from which the portion 14 and wings 15 and 16 are formed is bent back upon itself to form an overlapping section 17 which is glued or otherwise secured to the outer face of the portion 14. The section 17 is extended to form a flap or wing portion made up of hinged sections 18 and 19, these sections being integrally formed and joined at a bend line 20 so that the section 19 may be angularly disposed relative to the section 18. The portion 14 and section 17 are provided with coincident spaced square or rectangular openings 21 and 22 which give entrance to the envelope pocket.

It will be observed that the lateral edges 23 and 24 of the section 18 are in outward converging relation so as to bring the end edges of the section 19 into an inwardly spaced position relative to the wings 15 and 16 respectively. The sections 18 and 19 are provided with an interconnected substantially elliptical opening which forms a cut-out portion 25 in the section 18 and a nose-receiving opening 26 in the section 19. This latter section is formed by bending the end margin of the material back upon itself to form an outside layer 27 and inner layer 28 in superposed relation.

The layers of the section 19 are provided with spaced openings 27' and 28' which extend through both layers of the section and are positioned on either side of the nose opening 26 in such manner that when the sections 18 and 19 are folded into the position shown in Figure 2, these openings will be respectively disposed at a suitable distance in front of the windows 21 and 22. By having suitable lenses disposed in the openings 27' and 28', the device, when so folded, forms the optical device commonly known as a stereoscope.

The lenses may be mounted in several ways in the section 19. One method of mounting the lenses which has been satisfactory is to provide separately formed lenses 29 and 30 of suitable material and slightly larger in diameter than the openings 27' and 28'. The lenses are disposed in the openings with their peripheral edges between the section layers and are held in position by a lens-holding strip 31 having cut-out portions for coinciding with the openings 27' and 28' as well as the nose opening 26. The lens-holding strip may be constructed of any suitable material, such as cardboard, metal, fiber or molded plastic material such as Celluloid.

The assembled parts of this section, namely, the layers 27, 28 and the lens-holding strip may be secured in assembled relation by means of metallic clips 32 which are preferably circumferentially spaced around the respective lenses and adjacent thereto. The lens-holding strip adjacent its ends is provided with aligned side notches 33 and 34 which are arranged to be associated with the side edges of an edge-opening notch 35 formed in the uppermost end of each of the wings 15 and 16, as shown in Figure 2.

When utilizing the device, the pictures, advertising material or other indicia are viewed through the windows 21 and 22. Such indicia are carried on a strip or card 36 which is normally disposed in the pocket 10 of the envelope and may be longitudinally withdrawn with a sliding movement so as to successively present the indicia thereon to the view of the user.

While in the present instance only one card is described as being disposed in the pocket of the envelope, it will be readily apparent that a number of such cards may be normally placed therein.

Although I have previously described one arrangement in which the lenses may be mounted in the section 19, I prefer to provide a lens and lens-carrier strip as shown in Figures 4 and 5. In this construction, instead of providing independent lenses, I provide a strip 31' which is constructed of a moldable plastic material, such, for example, as Celluloid. This strip, instead of being provided with lens-openings as previously described, is provided with thickened portions 29' and 30' which are so formed as to have lens characteristics, these portions being integral with the strip.

It will therefore be apparent that this construction materially simplifies the lens and mounting arrangement and enables it to be produced at a much lower cost than if separate lenses were provided. This construction is obtained by placing a moldable plastic material in a suitable die or mold. With some plastics, it is necessary to subject the material to pressure, while with others the material is simply molded without the application of additional pressure. In either case, the lens portions as well as the lens mounting strip having the connecting notches at its ends may be simultaneously and integrally produced.

While the integrally formed lens and mounting strip have been described as being constructed of a plastic material, such as Celluloid, it will be apparent to those skilled in the art that any other suitable plastic may be utilized according to this invention. Moreover, I do not intend to limit the use of this construction solely to stereoscopes, as the invention may with equal facility be utilized in other types of optical devices.

From the foregoing description, it will be apparent that the present invention provides an improved lens and lens mounting construction which may be produced by my novel method, which may be constructed of a moldable plastic material so as to render the lens unbreakable, and which may be produced inexpensively and incorporated in different types of optical devices.

It is, of course, to be understood that although I have described in detail a preferred and modified form of the invention, the invention is not to be thus limited, but only insofar as defined by the scope and spirit of the appended claim.

I claim as my invention:

In an optical device, a lens carrier comprising an elongate strip having longitudinally extending fold portions in adjacent relation and spaced pairs of registered openings therethrough, a strip between said fold portions having an opening therethrough concentric with and of larger diameter than each of said pairs of registered openings, said last strip extending beyond the ends of said first strip and having aligned edge recesses at each end thereof for receiving a supporting member, a lens for each pair of said registered openings having the periphery thereof seated in a concentric enlarged opening in said last strip and the peripheral edge margins thereof seated between said fold portions, means for connecting said fold portions and said last strip together adjacent the periphery of each of said lenses, and an enlarged recess through said connected strips between the spaced lenses.

ELLIS M. BRANSON.